March 11, 1930.  A. E. L. CHORLTON  1,750,570
INTERNAL COMBUSTION ENGINE
Filed May 22, 1924  2 Sheets-Sheet 1

March 11, 1930.  A. E. L. CHORLTON  1,750,570
INTERNAL COMBUSTION ENGINE
Filed May 22, 1924  2 Sheets-Sheet 2

INVENTOR
A. E. L. Chorlton
BY Watson, Coit, Morse + Grindle
ATTYS.

Patented Mar. 11, 1930

1,750,570

UNITED STATES PATENT OFFICE

ALAN ERNEST LEOFRIC CHORLTON, OF LONDON, ENGLAND, ASSIGNOR OF ONE-HALF TO WILLIAM BEARDMORE, OF LONDON, ENGLAND

INTERNAL-COMBUSTION ENGINE

Application filed May 22, 1924, Serial No. 715,231, and in Great Britain May 29, 1923.

This invention relates to internal combustion engines and has for its object to provide an improved form of engine of the kind in which part or all of the fuel is delivered into the combustion chamber in a liquid state.

According to this invention fuel in a liquid state is injected directly into the cylinder and is ignited as a result of the combustion in the cylinder of an admixture of a heating agent such as hydrogen with air which have been drawn into the cylinder either as a mixture or separately. Thus by the employment of a quick burning heating agent such as hydrogen and its combustion with an air charge drawn into the cylinder the temperature in the cylinder is raised sufficiently to ignite the liquid fuel. The admission of hydrogen and air may be controlled by a sleeve valve whether the hydrogen enters the combustion space separately from or mingled with the air. Alternatively, the admission of hydrogen and air may be controlled by poppet valves.

In another construction of internal combustion engine according to this invention a combustion chamber is formed in the head of the cylinder and provided with means for injecting fuel in a liquid state into this combustion chamber, while a sleeve valve controls the flow of the hydrogen and other gases into and out from the cylinder through suitably disposed ports. In this construction it is preferable to provide a somewhat constricted passage or opening between the combustion chamber and the cylinder the piston stroke being then determined so that substantially the whole of the gaseous charge is compressed within the combustion chamber thus producing desirable turbulence. Such an arrangement is especially suitable for engines operating at high speed. Conveniently the ports or passages through which the main part of the gaseous charge enters the cylinder are disposed radially while a series of radially disposed ports or passages lead from the combustion chamber and serve for the escape of the exhaust products, all these ports being controlled by the sleeve valve. The combustion chamber preferably has a substantially symmetrical bulb-like formation and communicates with the cylinder through an opening having a diameter less than the maximum diameter of the bulb.

The invention may be carried out in various ways but the accompanying drawings illustrate by way of example two alternative constructions that may be adopted. In these drawings Figure 1 is a vertical sectional elevation of a cylinder head illustrating a construction in which the flow of gases into and out from the cylinder is controlled by a sleeve valve, the section being taken on the line 1—1 in Figure 2.

Like letters indicate like parts throughout the drawings.

Figure 1:
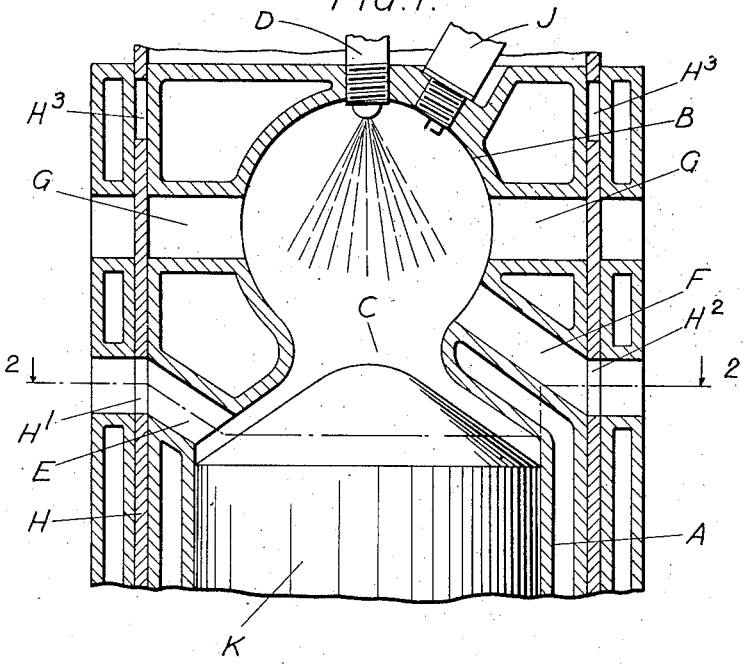
Figure 2:
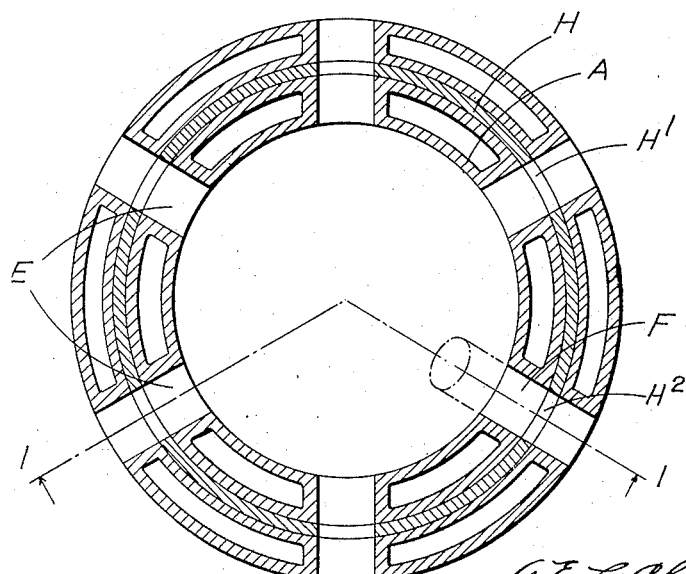
Figure 2 is a transverse section on the broken line 2—2 in Figure 1.

Referring to the construction illustrated in Figures 1 and 2 the cylinder A has formed in its head a combustion chamber B the shape of which may conveniently be substantially spherical as shown in the drawings. This chamber B communicates with the end of the cylinder A by way of a somewhat constricted opening or passage C. An injector D by means of which liquid fuel can be delivered into the combustion chamber B is disposed preferably centrally as shown so that the fuel enters in a spray in such a manner as to thoroughly permeate the air in the combustion space.

A series of short passages E which in effect may be little more than ports are formed radially in the cylinder head these ports or passages leading not directly into the combustion space B but into the end of the cylinder beyond the opening C. A single radially arranged port or passage F leads on the other hand directly into the combustion chamber B. The passages E and F are conveniently spaced apart at equal distances around the cylinder as shown in Figure 2.

A series of radially arranged passages G open into the combustion chamber B substantially in the positions indicated in Figure 1. The flow of the gases into and out from the cylinder through the passages E, F and G is controlled by a sleeve valve H of suitable type and construction having therein ports H′ H² and H³ adapted to register with the ports at the end of the passages E, F and G. This sleeve valve may be moved and actuated in some convenient known manner. In the combustion chamber is a sparking plug J preferably situated near the fuel injector D.

During the suction stroke air is drawn into the cylinder through the passages E while hydrogen enters through the passage F. Owing to the arrangement of the passage F the stream of hydrogen will be directed into the combustion chamber B while the air will flow at first into the cylinder but will be forced by the action of the piston K on its compression stroke through the opening C into the combustion chamber B wherein such turbulence will be caused as will bring about a thorough admixture of the air and hydrogen. The stroke of the piston K is so determined that substantially the whole of the air charge will be compressed into the combustion chamber B. The mixture of air and hydrogen is then ignited by the sparking plug J and the temperature will be raised thereby to such an extent as to cause ignition of the liquid fuel which is injected at the correct moment into the chamber B. The mixture of hydrogen and air is a weak one the excess of air serving for the effective combustion of the liquid fuel. The hydrogen and air mixture is, however, of sufficient strength to serve for running the engine at light loads no liquid fuel being then injected but injection taking place as and when greater power is required. The products of combustion flow out from the cylinder through the passages G.

A construction of internal combustion engine similar to that described above and illustrated in Figures 1 and 2 may according to this invention be employed without the admission of hydrogen or other heating agent, the ignition of the liquid fuel charge being effected in any convenient known manner.

Figure 3:
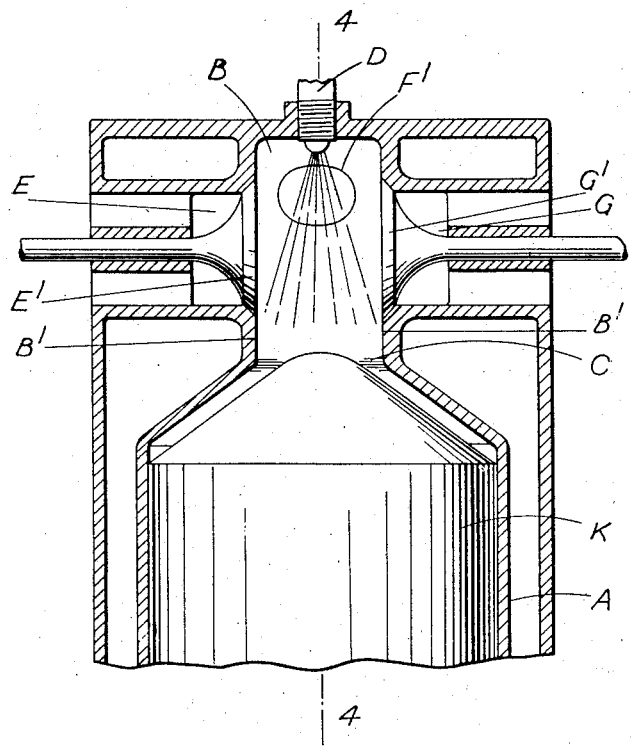
Figure 3 is a vertical section of an alternative construction in which poppet valves are employed to control the flow of gas into and out from the cylinder.
Figure 4:
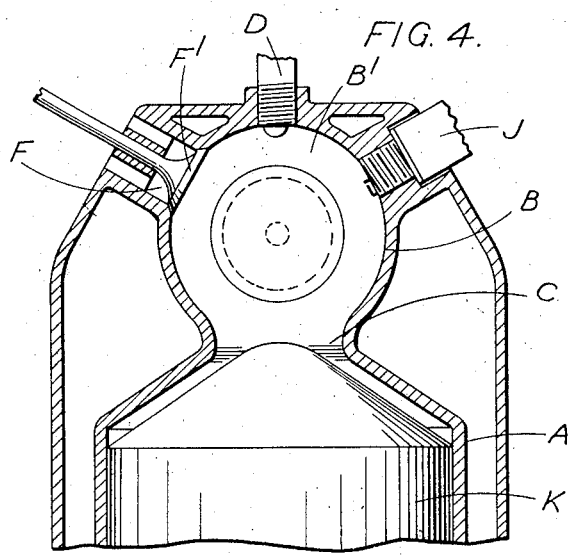
Figure 4 is also a vertical section of the same construction but taken on the line 4—4 in Figure 3.

Referring to the construction shown in Figures 3 and 4 in this case poppet valves are employed. The combustion chamber B has a substantially spherical shape when viewed in one plane as seen in Figure 4, but is flattened at two sides as shown at B′ in Figure 3, ports being formed in these sides with seatings for valves E′ and G′ which control respectively the inflow of air through the passage E and the outflow of exhaust products through the passage G. The hydrogen enters through the passage F controlled by a poppet valve F′ this passage and its port being of less diameter than the air passage E. The fuel injector D and the sparking plug J are arranged in the combustion chamber as in the previously described construction. The valves E′, F′ and G′ are actuated in some convenient manner and the weak mixture of air and hydrogen ignited by the sparking plug J brings about the ignition of the fuel entering through the injector D.

The details of construction may be varied as found desirable in accordance with the general structure of the engine to which the invention is applied and the purpose for which it is to be used.

Engines of either of the above-mentioned types may be usefully employed for airship propulsion where the hydrogen valved, or allowed to escape by reason of the reduction of load of the ship due to consumption of oil fuel in the engines, etc., may be burnt in the engines themselves, that is, the motors may run for light loads as engines using hydrogen as a fuel; the oil fuel being injected into the cylinders when required to generate greater powers.

What I claim as my invention and desire to secure by Letters Patent is:—

1. The method of operating an internal combustion engine having a cylinder provided with combustion and piston chambers connected by a short restricted passage which consists in admitting air and hydrogen at separate points into the combustion chamber on the suction stroke of the piston, compressing this charge of air and hydrogen into the combustion chamber, igniting the hydrogen in the combustion chamber near the end of the compression stroke and injecting a charge of liquid fuel into the hot gaseous media in the combustion chamber, the charge of air being sufficient for burning both the hydrogen and the charge of liquid fuel.

2. The method of operating an internal combustion engine having a cylinder provided with combustion and piston chambers connected by a short restricted passage, which consists in admitting air and hydrogen at separate points into the combustion chamber on the suction stroke of the piston, compressing this charge of air and hydrogen into the combustion chamber, igniting the hydrogen in the combustion chamber near the end of the compression stroke and at a predetermined instant by an electrical spark, and injecting a charge of liquid fuel into the hot gaseous media in the combustion chamber, the charge of air being sufficient for burning both the hydrogen and the charge of liquid fuel.

3. The method of operating an internal combustion engine which consists in admitting a charge of hydrogen into the combustion chamber, admitting a charge of air in excess of the amount required to support combustion of the hydrogen into the combustion chamber, igniting the gaseous charge, and injecting a charge of liquid fuel into the hot gaseous charge, whereby the liquid charge is ignited and the excess air serves to support the combustion of the liquid fuel.

4. The method of developing power in an internal combustion engine which consists in providing ignition and power phases in the engine cycle, in admitting air during the suction stroke of the engine in quantities sufficient for both phases, in admitting separately from the air a combustible to the cylinder in quantities sufficient to provide high temperature gases for ignition, in igniting the mixture of combustible and air near the end of the compression stroke, and in injecting a charge of fuel into the high temperature products of combustion resulting from the ignition phase.

In testimony whereof I have signed my name to this specification.

ALAN ERNEST LEOFRIC CHORLTON.